(12) United States Patent
Kruszewski et al.

(10) Patent No.: US 8,347,420 B2
(45) Date of Patent: Jan. 8, 2013

(54) THERMAL LINER SUBASSEMBLY, FABRIC AND METHOD OF USE

(75) Inventors: Reginald Thomas Kruszewski, Midlothian, VA (US); Richard Hall Young, Richmond, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 856 days.

(21) Appl. No.: 12/080,397

(22) Filed: Apr. 2, 2008

(65) Prior Publication Data

US 2009/0249531 A1    Oct. 8, 2009

(51) Int. Cl.
*A62B 17/00*    (2006.01)

(52) U.S. Cl. .......................................... 2/458

(58) Field of Classification Search .................. None
See application file for complete search history.

(56) References Cited

U.S. PATENT DOCUMENTS

| | | | |
|---|---|---|---|
| 3,383,273 A * | 5/1968 | Pearson et al. ................. 442/352 |
| 3,549,307 A * | 12/1970 | Hirsch .......................... 8/115.54 |
| 3,671,379 A * | 6/1972 | Evans et al. ................... 428/362 |
| 3,767,766 A | 10/1973 | Blades |
| 3,869,429 A | 3/1975 | Blades |
| 3,869,430 A | 3/1975 | Blades |
| 4,034,417 A * | 7/1977 | Ellis ..................................... 2/81 |
| 4,502,153 A * | 3/1985 | Lapedes et al. ...................... 2/81 |
| 4,604,759 A * | 8/1986 | Bowman et al. ..................... 2/81 |
| 4,865,906 A * | 9/1989 | Smith, Jr. ...................... 442/197 |
| 5,001,781 A * | 3/1991 | Grilliot et al. ....................... 2/69 |
| 5,279,878 A * | 1/1994 | Fottinger et al. .............. 428/102 |
| 5,924,134 A * | 7/1999 | Taylor et al. ......................... 2/81 |
| 5,928,971 A * | 7/1999 | Ellis et al. ......................... 442/76 |
| 6,247,179 B1 * | 6/2001 | Underwood et al. ............... 2/81 |
| 6,430,754 B1 * | 8/2002 | Taylor et al. ...................... 2/458 |
| 6,699,802 B1 * | 3/2004 | Hainsworth et al. ............. 442/2 |
| 6,955,193 B2 | 10/2005 | Hainsworth et al. |
| 6,983,490 B1 * | 1/2006 | Lewis et al. ......................... 2/97 |
| 7,226,877 B2 | 6/2007 | Bascom et al. |
| 7,229,937 B2 | 6/2007 | Bascom et al. |
| 2005/0144695 A1 * | 7/2005 | Aldridge et al. .................... 2/69 |
| 2006/0019566 A1 * | 1/2006 | Lloyd et al. .................... 442/136 |
| 2006/0111000 A1 * | 5/2006 | Bascom et al. ................. 442/136 |
| 2006/0143809 A1 * | 7/2006 | Dunn ................................. 2/458 |
| 2008/0189840 A1 * | 8/2008 | Knoff et al. ...................... 2/458 |
| 2009/0140450 A1 * | 6/2009 | Zhu et al. ....................... 264/109 |

* cited by examiner

*Primary Examiner* — Khoa Huynh
*Assistant Examiner* — Anna Kinsaul

(57) ABSTRACT

The present invention concerns a thermal liner sub-assembly comprising crimped, heat resistant fibers held in a state of compression by a binder adhered to at least one thermally stable flame resistant stabilizing fabric wherein, when the thermal liner is exposed to heat or flame, the liner increases its thickness by at least one hundred percent and the shrinkage of the liner is no more than ten percent.

The invention also relates to use of such liners in protective fabrics, garments, and articles.

7 Claims, No Drawings

THERMAL LINER SUBASSEMBLY, FABRIC AND METHOD OF USE

BACKGROUND OF THE INVENTION

1. Field of the Invention

This invention concerns thermal liners having good thermal insulation and breathability under non-emergency conditions but, when under high thermal exposure, the liners provide an increase in thermal insulation and flame resistance thereby enhancing protection. The invention also covers a composite fabric system incorporating an outer shell fabric, a liquid barrier and the thermal liner. The invention further covers a protective garment.

2. Background of the Invention

The thermal liners or barriers used in firefighter's turnout coats have two thermal property needs that are in opposition to each other. During non-emergency conditions, the thermal liner should have good thermal insulation and breathability to provide maximum comfort for the wearer. However, in the event of a high thermal exposure such as encountered in an emergency condition, the thermal liner must have high thermal insulation in order to protect the wearer from burns. Turnout coats that provide high levels of thermal insulation are typically bulky during all conditions. The bulk of these coats inhibits the ability of the user to perform effectively due to movement inhibition and fatigue related to the garment weight. Thus, there is a need to provide adequate protection with reduced coat bulk during non-emergency conditions.

U.S. Pat. No. 7,229,937 to Bascom at al describes a nonwoven fire blocking fabric comprising an open mesh scrim having crimped heat-resistant organic fibers compressed thereon and held in a compressed state by a thermoplastic binder. U.S. Pat. No. 7,247,585 also to Bascom at al describes a modification of the concept patented above wherein then fire-blocking fabric has ridges and grooves. U.S. Pat. No. 7,226,877 to Bascom et al teaches an impermeable polymeric film laminated to an open mesh scrim having crimped heat-resistant organic fibers compressed thereon and held in a compressed state by a thermoplastic binder. U.S. Pat. No. 6,955,193 to Hainsworth et al discloses a fire resistant woven fabric material comprising a front face woven from meta-aramid fiber and a back face woven from para-aramid fiber.

Despite the functionality of these fabrics, there is still a need for further improvements particularly in the areas of flame resistance of the finished garment, minimizing shrinkage reduction of the thermal liner and reducing abrasion resistance of the thermal liner.

SUMMARY OF THE INVENTION

The present invention is directed to a heat and flame resistant thermal liner sub-assembly comprising at least one thermally expanding nonwoven flame resistant fabric made from crimped, heat resistant fibers held in a state of compression by a binder, at least one thermally stable flame resistant fabric adhered to an outer surface of the thermally expanding flame resistant fabric by a binder, wherein when the thermal liner sub-assembly is exposed to heat or flame, the liner increases its thickness in a range from 100% to 1100% and shrinkage of the liner sub-assembly in the machine and cross directions is no greater than 10%.

The invention is also directed to a composite fabric system incorporating the thermal liner with an outer shell fabric and a liquid barrier and is further directed to a method for protecting an object from heat by interposing a composite fabric system between the object and the source of heat.

DETAILED DESCRIPTION OF ILLUSTRATIVE EMBODIMENTS

Definitions

The term "adjacent to," when used to refer to fabric location, does not necessarily mean that one fabric is immediately next to another fabric. An intervening fabric may be positioned between adjacent fabrics. Fabrics that directly contact each other, however, are still adjacent to each other.

The term "adhered to" when used to refer to two fabric layers being in contact with each other means that that the two layers are bound to each other with sufficient adhesion that a pulling force is required to separate them. This pulling force can be hand force.

The term "fabric" is intended to mean any woven, knitted, plaited, braided, felted or nonwoven material made of fibers or yarns.

A "scrim" is a lightweight, open mesh, coarse fabric having between 2 to 15 ends per inch (0.8 to 6 ends per cm.) in both warp and fill directions.

By "nonwoven" fabric is meant a textile structure produced by bonding and/or interlocking of fibers into a random web or mat accomplished by mechanical, chemical, thermal or solvent means and combinations thereof.

By "woven" fabric is meant a fabric composed of two sets of yarns, warp and fill, that is formed by weaving which is the interlacing of these sets of yarns. Woven fabrics of this invention have 15 to 75 ends per inch (6 to 30 ends per cm.) in both warp and fill directions.

By "crimped" fiber is meant a wavy fiber having a waviness expressed as number of crimps per unit length.

The phrase "heat resistant" when used in conjunction with fibers means those fibers, including staple fibers, that retain 90 percent of fiber weight when heated in air to 500° C. at a rate of 20° C. per minute.

The phrase "flame resistant" refers to a fabric that has a char length equal to or less than 4 inches and an afterflame equal to or less than 2 seconds per the vertical flame test of ASTM D6143-99.

"Machine direction" is the lengthwise direction in a roll of fabric goods. This is sometimes referred to as the warp direction.

"Cross direction" is the direction orthogonal to the machine direction. This is also known as the fill direction.

"Shrinkage" is a measure of the change in fabric dimensions in the machine and cross directions of the thermal liner before and after heat activation.

"Batt" or "batting" is a soft bulky assembly of fibers.

The terms "thermal liner" and "thermal barrier" are used interchangeably.

A necessary element of the thermal liner is a thermal liner sub-assembly comprising crimped, heat resistant fibers held in a state of compression by a thermoplastic binder. These liner sub-assemblies, when exposed to heat or flame, increase in thickness by at least 100 percent of the liner's pre-exposure thickness. These thermal barriers comprise a thermally activating nonwoven thin sheet that when exposed to heat increases in thickness, by means of a bulking mechanism, from 100% to 1100%. Temperatures as low as 150 centigrade can initiate the bulking effect and at temperatures of 225 centigrade or higher the bulking action proceeds immediately. Under normal conditions, the thermal barrier has good thermal conductivity and breathability, whereas under high thermal exposure, the barrier's thermal conductivity decreases dramatically thus, providing excellent protection. When the compressed fibers are subjected to high heat or flame, the binder in the structure softens, releasing the restrained crimped fibers and allowing the thickness of the fabric to increase dramatically. This increase creates pockets of air in the fabric, which is believed to increase the fabric's thermal performance.

The nonwoven fabric is capable of increasing its thickness in response to high heat or flame because the crimped heat-resistant fibers are compressed but not appreciably entangled in the fabric.

"Crimped fibers" are preferably staple fibers that have cut lengths in the range of 0.4 to 2.5 inches (10 to 63 mm) preferably 0.75 to 2 inches (19 to 51 mm) and preferably have 5 to 12 crimps per inch (2 to 5 crimps per centimeter). Such fibers can be formed by stretch breaking continuous fibers resulting in staple fibers with deformed sections that act as crimps. The staple fibers can also be cut from continuous fibers having a saw tooth shaped crimp along the length of the staple fiber.

The heat resistant fibers for the thermally expanding flame resistant nonwoven fabric have a yarn tenacity of at least 3 grams per denier (2.7 grams per dtex). Suitable fibers are aromatic polyamide, polyolefin, polyareneazole, melamine, polyacrylonitrile, polyimide, polyvinyl alcohol and mixtures thereof. Preferred fibers are para-aramid, polybenzazole, polybenzimidazole and polyimide polymer. In certain of these embodiments, para-aramid fiber is most preferred.

As used herein, "aramid" refers to a polyamide wherein at least 85% of the amide (—CONH—) linkages are attached directly to two aromatic rings. "Para-aramid" means the two rings or radicals are para oriented with respect to each other along the molecular chain. Additives can be used with the aramid. In fact, it has been found that up to as much as 10 percent, by weight, of other polymeric material: can be blended with the aramid or that copolymers can be used having as much as 10 percent of other diamine substituted for the diamine of the aramid or as much as 10 percent of other diacid chloride substituted for the diacid chloride of the aramid. In the practice of this invention, the preferred para-aramid is poly(paraphenylene terephthalamide). Methods for making para-aramid fibers useful in this invention are generally disclosed in, for example, U.S. Pat. Nos. 3,869,430, 3,869,429, and 3,767,756. Such aromatic polyamide organic fibers and various forms of these fibers are available from DuPont Company, Wilmington, Del. under the trademark Kevlar®.

The thermally expanding nonwoven web can be compressed by any means known in the art. A preferred method of compression is by using a carding machine followed by collection of one or more cards or batts of the carded fibrous webs on a transportation belt.

A further necessary element of the thermal liner sub-assembly is a thermoplastic binder that is used to hold the crimped fiber in a compressed state. The binder should have a softening point lower than the softening point of any other fibers present in the liner sub-assembly. The thermoplastic binder can be in the form of fiber, web or powder and should be used in an amount sufficient to hold the crimped fiber in a compressed state and to bind the thermally stable fabric to the crimped fiber fabric. The function of binder powder is primarily to aid the adhesion between the thermally stable fabric and the thermally expanding fabric. In some embodiments, no binder powder is utilized and the binder consists only of fibrous binder. A hybrid binder of powder and fiber can also be utilized. When both fiber and powder binders are used, the amount of binder powder should be less than 20% and preferably less than 15% of the total binder present. The total amount of binder present should be from 15-45% and preferably 20-40% of the total weight of binder plus crimped fiber. Any type of binder that will hold the heat resistant fibers in compression can be utilized. In some embodiments, useful binders include crimped sheath-core bonding fiber having a core of semi-crystalline polyethylene terephthalate surrounded by a sheath of an adhesive polymer formed from isophthalate and terephthalate esters. The sheath is heat softenable at a temperature lower than the core material. Such fibers are available from Unitika Corp. of Osaka, Japan or from Huvis Corporation. Seoul, Korea. Other sheath/core adhesive fibers, however, may be used with the present invention. Other thermoplastic binders, available in a fibrous or powder form, include copolyesters, polyamides, polyethylene and polypropylene. In addition, one can contact the heat resistant fibers with a liquid adhesive to achieve a thermal barrier. Examples of such adhesives include aqueous dispersions of adhesives. Where fibrous and powdered binders are both used, it is preferable that the choice of binders are such that they have similar melting points for example, no more than a 50° F. to 59° F. (10° C. to 15° C.) differential in melting point between the two materials. A preferred binder powder is Griltex® copolyester EMS6E from EMS-Chemie, Donat/Ems, Switzerland.

Binder fiber may be added during the carding process so as to intermingle with the carded fibers as well as remain on the surface of the carded web. Binder powder is best added after the carding step and before the thermally stable fabric lamination point. Binder can be applied to the combined carded webs in a preferred amount of about 0.1 to 0.9 oz/yd$^2$ (3.4 to 30 g/m$^2$). The combined webs are then conveyed through at least one oven at a temperature sufficient to soften and partially melt the binder fiber and/or powder and allow it to adhere the fibers together A third necessary feature of the thermal liner sub-assembly is a thermally stable fabric adhered to at least one outer surface of the thermally expanding material of the sub-assembly. In a preferred mode, such a fabric expands by no more than 10 percent, more preferably by no more than by 6 percent and most preferably by no more than 3 percent in the machine and cross directions when subjected to a temperature greater than 150 degrees C. Such values translate well into shrinkage observed in a quilted thermal liner.

The amount of surface contact between the thermally stable fabric and the thermally expanding fabric should be from 30-100%, more preferably from 60-100% and most preferably from 80-100%. In some preferred embodiments, this thermally stable fabric is flame-resistant. This thermally stable fabric acts as a stabilizing fabric in that it remains flat and dimensionally stable after heat exposure and there is sufficient adhesion to the thermally expanding fabric to minimize shrinkage of the thermally active layers after heat activation. This thermally stable fabric also helps reduce abrasion of the thermally expanding material of the thermal liner. The thermally stable fabric may be a woven or nonwoven fabric, preferably nonwoven, having a weight preferably in the range from 0.2 to 3.0 oz/yd$^2$ (7 to 101 g/m$^2$). A suitable thermally stable fabric is Nomex® E89, a spunlaced nonwoven material produced from a blend of Nomex® and Kevlar® staple fibers available from DuPont. E89 fabric has a nominal thickness of 19 mil (0.48 mm) and a basis weight of 1.5 oz/yd$^2$ (50.5 g/m$^2$). When used in conjunction with an outer shell fabric and a liquid barrier, it is preferred that that the thermally stable fabric is the side of the sub-assembly that is closest to the liquid barrier. The thermally stable fabric is adhered to the thermally expanding fabric by the binder described above. The thermally stable flame resistant stabilizing web is best applied to the surface of the carded web immediately prior to entering or exiting an oven and the entire sub-assembly then compressed between two closed rolls to consolidate or adhere the various layers into a cohesive fabric. The fabric is then cooled in this compressed state.

In some embodiments, more than one thermally expanding nonwoven can be used in the thermal liner sub-assembly layer. The thermally expanding webs can be in contact with each other or separated by one or more of the substantially thermally stable fabrics In one embodiment, the thermal liner sub-assembly comprises three carded batts of crimped p-aramid fiber as the thermally expanding material and one spunlaced meta-aramid nonwoven web as the non-thermally expanding material.

Another necessary feature of the thermal liner is that the thermal liner also incorporates, as a second layer, a lightweight woven flame resistant fabric as a facecloth. This second layer is not part of the sub-assembly described above. Suitable flame resistant fibers for a fabric of the second layer include aramid, especially meta-aramid. Fiber blends such as meta-aramid and flame retarded (fr) cotton or meta and para-aramids with modacrylic fiber are also suitable for this application. A preferable fiber is a blend of 93% meta-aramid, 5% para-aramid and 2% carbon core nylon antistatic fiber, such blended fiber being Nomex®IIIA, available from E.I. DuPont de Nemours, Wilmington, Del. A plain weave fabric is the preferred cloth style although other styles may be used. The fabric weight should be in the range of 4.0 to 9.0 oz/yd$^2$ (135-305 g/m$^2$) with a range of 4.5-6.0 oz/yd$^2$ (152-203 g/m$^2$) being preferred.

In certain embodiments, the facecloth and sub-assembly layers of the thermal liner may be mechanically attached. Methods of mechanical attachment include, but are not limited to, stitching and quilting. Suitable quilt patterns include box, zig-zag, straight line diagonal or chevron.

In some embodiments of the invention, the thermal liner can be used in a composite fabric system for protective garments, the composite fabric system having at least three components, each component performing a distinct function. The first component, the outer layer, is a shell fabric that provides flame protection and serves as a primary defense from flames for the fire fighter. Adjacent to the outer shell is a liquid barrier, the second component, which is typically a barrier against liquids but can be selected such that it allows moisture vapor to pass through the barrier. Adjacent to the liquid barrier is the thermal liner, the third component, described herein. The liquid barrier keeps the thermal liner dry and the thermal liner insulates the wearer from heat during firefighting activities. The thermal liner provides the major contribution to the thermal protection of the composite fabric system and hence the protective garment.

The outer shell can consist of any flame resistant fabric. In some embodiments, the shell comprises aramid fiber. One suitable aramid is poly(metaphenylene isophthalamide) which is marketed under the tradename of Nomex® by E.I. DuPont de Nemours, Inc. Other fabrics utilize poly(paraphenylene terephthalamide) (marketed under the tradename of Kevlar® by E.I. DuPont de Nemours, Inc.) or a polyarenazole such as polybenzimidazole (PBI). Fabrics containing more then one of the aforementioned fibers may also be utilized (Nomex®/Kevlar® or Kevlar®/PBI, for example).

The liquid barrier is a component that serves as a barrier against liquids but can allow moisture vapor to past through the barrier. In articles such as firefighter turnout coats, these barriers keep water away from the firefighter and thereby minimize the weight that the firefighter carries. In addition, the barrier allows water vapor (sweat) to escape, an important function when working in a hot environment. Typically, the moisture barrier component comprises a membrane laminated to a nonwoven or woven fabric. Membrane materials used to laminate to the fabric include polytetrafluoroethylene (PTFE) and polyurethane. Examples of such laminates include Crosstech® PTFE membrane or Neoprene® membranes on a fibrous nonwoven or woven meta-aramid fabric.

The invention also relates to a method of protecting an object from heat comprising interposing between the object and the source of heat a thermal barrier comprising crimped, heat resistant fibers held in a state of compression by a thermoplastic binder adhered to at least one thermally thermally stable flame resistant stabilizing layer. In some embodiments, the object is a human and the thermal barrier resides in protective apparel.

Test Methods

Vertical Flame Test. Vertical flame performance of the thermal liner was measured using ASTM D6413-99

Thickness. Thickness measurements of the composite fabric of this invention were measured as per ASTM D1777-96 Option 1 using a standard pedestal mounted micrometer.

Basis Weight. The basis weight of the composite fabric was determined from the weight of the 6.75 inch×6.75 inch TPP test specimens.

Durability. The durability of the thermal liner was measured according to ASTM D3884-01.

Shrinkage. Thermal liner shrinkage was tested according to the method described in the National Fire Protection Association's 2007 edition of NFPA 1971.

The invention is illustrated by the following examples that are not intended to be limiting. In the examples, all parts and percentages are by weight, degrees in centigrade and dimensions in inches unless otherwise set forth.

Comparative Example 1

A reinforced nonwoven fabric for the thermal liner sub-assembly was prepared as follows. 70 parts 2.2 denier per filament (dpf), 2 inch cut length Type 970 Kevlar® brand staple fiber and 30 parts 4 dpf, 2 inch cut length type LMF-950A 50/50 sheath/core 110° C. melting point binder fiber from Huvis Corporation were blended as fed from bales to three cards on a carding machine. Fiber webs from the three cards were collected on a transporting belt to create a fiber mat having a basis weight of approximately 2.7 oz/yd$^2$ (92 g/m$^2$). An open mesh scrim of polyester filament yarn was inserted between the two webs formed by the first two cards. The open mesh scrim was a Saint Gobain scrim (Type KPMR10510/P3 having 5 ends/inch of 150 denier polyester in the fill direction and 10 ends/inch of 70 denier polyester in the warp direction) that had a basis weight of 0.3 oz/yd$^2$ (10 g/m$^2$). The resulting structure had two carded webs on one side of the open mesh scrim and one carded web on the other side of the scrim.

The combined webs and scrim were conveyed through an oven at 141° C. to melt the binder fiber. At the oven exit the sheet was compressed between two closed rolls that consolidated the components into a cohesive fabric. The fabric then cooled in this compressed state.

The final composition of the fabric was approximately 63% Kevlar® fiber, 27% binder fiber, 10% polyester scrim. Characterization data from two campaigns of this nonwoven sub-assembly is shown as test references TL102 and RY 81 in Table 1, Comparative Example 2

A reinforced nonwoven fabric for the thermal liner sub-assembly was prepared as follows. 70 parts 2.2 denier per filament (dpf), 2 inch cut length Type 970 Kevlar® brand staple fiber and 30 parts 4 dpf, 2 inch cut length type LMF-950A 50/50 sheath/core 110° C. melting point binder fiber from were blended as fed from bales to three cards on a carding machine. Fiber webs from the three cards were collected on a transporting belt to create a fiber mat having a basis weight of approximately 2.7 oz/yd² (92 g/m²). An open mesh scrim of polyester filament yarn was inserted between the two webs formed by the first two cards. The open mesh scrim was a Saint Gobain scrim (Type KPMR10510/P3 having 5 ends/inch of 150 denier polyester in the fill direction and 10 ends/inch of 70 denier polyester in the warp direction) that had a basis weight of 0.3 oz/yd² (10 g/m²). The resulting structure had two carded webs on one side of the open mesh scrim and one carded web on the other side of the scrim.

The combined webs were conveyed through an oven at 141° C. to melt the binder fiber. At the oven exit, a 1.5 oz/yd² (51 g/m²) web of spunlaced nonwoven aramid fiber, style 715 Nomex® E-89™ was placed on top of the carded batt materials and the sheets then compressed between two closed rolls which bonded the components into a cohesive fabric. The fabric was then cooled in this consolidated compressed state. The resulting structure had three carded webs on one side of the spunlaced nonwoven web. Characterization data for this nonwoven is included in Table 1.

The final composition of the fabric was approximately 63% Kevlar® fiber, 27% binder fiber, 10% polyester scrim. Characterization data of this nonwoven sub-assembly is included as test reference RY 79 in Table 1.

Comparative Example 3

A reinforced nonwoven fabric for the thermal liner sub-assembly was prepared as follows. 85 parts 2.2 denier per filament (dpf), 2 inch cut length Type 970 Kevlar® brand staple fiber and 15 parts 4 dpf, 2 inch cut length type LMF-950A 50/50 sheath/core 110° C. melting point binder fiber from Huvis Corporation were blended as fed from bales to three cards on a carding machine. Fiber webs from the three cards were collected on a transporting belt to create a fiber mat having a basis weight of approximately 2.7 oz/yd² (92 g/m²). An open mesh scrim of polyester filament yarn was inserted between the two webs formed by the first two cards. The open mesh scrim was a Saint Gobain scrim (Type KPMR10510/P3 having 5 ends/inch of 150 denier polyester in the fill direction and 10 ends/inch of 70 denier polyester in the warp direction) that had a basis weight of 0.3 oz/yd² (10 g/m²). The resulting structure had two carded webs on one side of the open mesh scrim and one carded web on the other side of the scrim. The combined webs were passed under a powder sprinkling machine and Griltex® EMS6E copolyester powder was added to the top surface of the web. The powder was deposited at a rate of 0.014 oz/yd² (0.48 g/m²).

The combined webs and scrim were conveyed through an oven at 141° C. to melt the binder fiber and powder. At the oven exit the sheet was compressed between two closed rolls that consolidated the components into a cohesive fabric. The fabric then cooled in this compressed state.

Characterization data from this campaign of a nonwoven sub-assembly is shown as test reference SC30H in Table 1, Example 1

A reinforced nonwoven fabric for the thermal liner sub-assembly was prepared as follows. 70 parts 2.2 denier per filament (dpf), 2 inch cut length Type 970 Kevlar® brand staple fiber and 30 parts 4 dpf, 2 inch cut length type LMF-950A 50/50 sheath/core 110° C. melting point binder fiber were blended as fed from bales to three cards on a carding machine. Fiber webs from the three cards were collected on a transporting belt to create a fiber mat having a basis weight of approximately 2.7 oz/yd² (92 g/m²).

The combined webs were conveyed through an oven at 141° C. to melt the binder fiber. At the oven exit, a 1.5 oz/yd² (51 g/m²) web of spunlaced nonwoven aramid fiber, style 715 Nomex® E-89™ was placed on top of the carded batt materials and the sheets then compressed between two closed rolls which bonded the components into a cohesive fabric. The fabric was then cooled in this consolidated compressed state. The resulting structure had three carded webs on one side of the spunlaced nonwoven web.

Characterization data from three campaigns of this nonwoven liner sub-assembly sub-assembly is included as RY 80, RY82 and RK01 in Table 1.

Example 2

A reinforced nonwoven fabric for the thermal liner sub-assembly was prepared as follows. 67 parts 2.2 denier per filament (dpf), 2 inch cut length Type 970 Kevlar® brand staple fiber and 28.5 parts 4 dpf, 2 inch cut length type LMF-950A 50/50 sheath/core 110° C. melting point binder fiber were blended as fed from bales to three cards on a carding machine. Fiber webs from the three cards were collected on a transporting belt to create a fiber mat having a basis weight of approximately 2.7 oz/yd² (92 g/m²).

The combined webs were passed under a powder sprinkling machine and 4.5 parts by weight of Griltex® EMS6E copolyester powder was added to the top surface of the webs. The webs were then conveyed through an oven at 141° C. to melt the binder materials. At the oven exit, a 1.5 oz/yd² (51 g/m²) web of spunlaced nonwoven aramid fiber, style 715 Nomex® E-89™ was placed on top of the carded batt materials and the sheets then compressed between two closed rolls which bonded the components into a cohesive fabric. The fabric was then cooled in this consolidated compressed state. The resulting structure had three carded webs on one side of the spunlaced nonwoven web. The composition of the carded batt, prior to lamination of the spunlaced web, was approximately 67.0% Kevlar® fiber, 28.5% binder fiber, 4.5% binder powder.

Characterization data of this nonwoven liner sub-assembly sub-assembly is included as RY 83 in Table 1.

Example 3

A reinforced nonwoven fabric for the thermal liner sub-assembly was prepared as follows. 72 parts 2.2 denier per filament (dpf), 2 inch cut length Type 970 Kevlar® brand staple fiber and 24 parts 4 dpf, 2 inch cut length type LMF-950A Huvis 50/50 sheath/core 110° C. melting point binder fiber were blended as fed from bales to three cards on a carding machine. Fiber webs from the three cards were collected on a transporting belt to create a fiber mat having a basis weight of approximately 2.7 oz/yd² (92 g/m²).

The combined webs were passed under a powder sprinkling machine and 4.0 parts by weight of Griltex® EMS6E copolyester powder was added to the top surface of the webs. The webs were then conveyed through an oven at 141° C. to melt the binder materials. At the oven exit, a 1.5 oz/yd² (51 g/m²) web of spunlaced nonwoven aramid fiber, style 715 Nomex® E-89™ was placed on top of the carded batt materials and the sheets then compressed between two closed rolls which bonded the components into a cohesive fabric. The fabric was then cooled in this consolidated compressed state. The resulting structure had three carded webs on one side of the spunlaced nonwoven web. The composition of the carded batt, prior to lamination of the spunlaced web, was approximately 72.0% Kevlar® fiber, 24.0% binder fiber, 4.0% binder powder.

Characterization data of this nonwoven liner sub-assembly is included as RY 84 in Table 1.

The data in Table 1 confirms the advantages of this invention. An acceptable afterflame value of equal to or less than 2 seconds was only obtained with those liner sub-assemblies containing no open mesh scrim and having a thermally stable fabric adhered to an outer surface of the thermally expanding fabric. Note that although TL 102 is reported as having good afterflame performance, a repeat example, RY 81, and further tests of TL 102 assembled and tested as a thermal liner gave failing afterflame results. Product RY 79 containing both a scrim and thermally stable fabrics in the liner sub-assembly was also unsatisfactory. Acceptable shrinkage values after heat activation of the liner sub-assembly was only obtained with constructions having no open mesh scrim and a thermally dimensionally stable fabric adhered to the crimped fibers.

The liner sub-assemblies of Example 1 and Comparative Example 2 were tested for abrasion resistance. Abrasion resistance was measured on a Taber 5150 Abraser using CS-10 rubber wheels and an applied weight of 2000 grams. The samples were conditioned at 70° F. (21° C.) and 65% relative humidity prior to testing for 10, 50 and 100 cycles. The results are shown in Table 2.

TABLE 1

Performance Data for Thermal Liner Sub-Assemblies

| Example & (Reference #) | Scrim in Sub-assembly | Splunlaced Web in Sub-assembly | % Increase in Thickness after Heat Activation | % Shrinkage after Heat Activation Requirement Equal or <10 | After flame (seconds) Requirement Equal or <2 |
|---|---|---|---|---|---|
| Comp. Ex. 1 (TL102) | Yes | No | 700 | 8 × 13 | 0 × 0.7 |
| Comp. Ex. 1 (RY 81) | Yes | No | 269 | 12 × 15 | 4.9 × 9.5 |
| Comp. Ex. 2 (RY 79) | Yes | Yes | 372 | 6 × 5 | 13.8 × 20.7 |
| Comp Ex. 3 (SC 30H) | Yes | No | 1050 | 12 × 14 | 3.2 × 1.2 |
| Example 1 (RK 01) | No | Yes | 121 | 2 × 1 | NM |
| Example 1 (RY 80) | No | Yes | 222 | 2 × 1 | 0 × 1.0 |
| Example 1 (RY 82) | No | Yes | 312 | 6 × 0 | 0 × 0 |
| Example 2 (RY 83) | No | Yes | 390 | 3 × 0 | 0 × 0 |
| Example 3 (RY 84) | No | Yes | 444 | 5 × 0 | 0 × 0 |

NM = Not Measured

TABLE 2

Abrasion Results

| Example (Reference #) | No. of Cycles | | |
|---|---|---|---|
| | 10 | 50 | 100 |
| Example 1 (RY80) | Light (No abrasion observed) | Light | Light |
| Comp. Example 2 (RY81) | Medium | Heavy | Heavy |

Based on a visual inspection of the tested samples, wear in the abraded area was quantified into the three categories of Light, Medium and Heavy. Light wear is where no more than 10% of the sample surface showed signs of abrasion, Medium wear is where from 10 to 50% of the sample surface showed signs of abrasion and Heavy is where greater than 50% of the sample surface showed signs of abrasion. The results clearly show that the sample comprising the spunlaced thermally stable nonwoven fabric adhered to the thermally expanding layers, Example 2, had significantly less abrasion than the sample containing the thermally expanding layers and a scrim, Comparative Example 2. The liners showing heavy wear were completely worn through with only the scrim remaining. This demonstrates an advantage of the present invention over the prior art.

What is claimed is:

1. A heat and flame resistant thermal liner sub-assembly comprising
   (a) at least one thermally expanding flame resistant fabric consisting of crimped, heat resistant para-aramid fibers held in a state of compression by a thermoplastic binder, the binder being present in an amount of 15 to 45 percent by weight, based on the weight of the binder plus crimped fiber; and
   (b) at least one thermally stable flame resistant fabric adhered to an outer surface of the thermally expanding flame resistant fabric by a thermoplastic binder, the surface contact between the thermally stable fabric and the thermally expanding flame resistant fabric being 80 to 100%;
   wherein, when the thermal liner sub-assembly is exposed to heat or flame, the thermally stable flame resistant fabric remains flat and dimensionally stable to minimize shrinkage of the thermally expanding flame resistant fabric, the liner increases its thickness in a range from 100% to 1100% and shrinkage of the liner sub-assembly in a machine direction and in a cross direction is no greater than 10%; and the thermal liner sub-assembly has an afterflame of no greater than 2 seconds when exposed to flame in accordance with ASTM D6143-99.

2. A thermal liner sub-assembly of claim 1 in which the thermally stable flame resistant fabric of the thermal liner sub-assembly is a spunlaced nonwoven fabric comprising meta-aramid fibers.

3. The thermal liner sub-assembly of claim 1, wherein the thermoplastic binders comprise copolyester.

4. A composite fabric system comprising:
an outer shell fabric,
a liquid barrier, and
a thermal liner; said thermal liner comprising a flame resistant woven fabric facecloth layer and a sub-assembly, the sub-assembly further comprising
   (a) at least one thermally expanding flame resistant fabric consisting of crimped, heat resistant para-aramid fibers held in a state of compression by a thermoplastic binder, the binder being present in an amount of 15 to 45 percent by weight, based on the weight of the binder plus crimped fiber; and
   (b) at least one thermally stable flame resistant fabric adhered to an outer surface of the thermally expanding flame resistant fabric by a thermoplastic binder, the surface contact between the thermally stable fabric and the thermally expanding flame resistant fabric being 80 to 100%;
wherein, when the thermal liner sub-assembly is exposed to heat or flame, the thermally stable flame resistant fabric remains flat and dimensionally stable to minimize shrinkage of the thermally expanding flame resistant fabric, the liner increases its thickness in a range from 100% to 1100% and shrinkage of the liner sub-assembly in a machine direction and in a cross direction is no greater than 10%; and the thermal liner sub-assembly has an afterflame of no greater than 2 seconds when exposed to flame in accordance with ASTM D6143-99.

5. The composite fabric system of claim 4, wherein the outer shell fabric comprises (poly(m-phenylene isophthalamide)).

6. A protective garment comprising the composite fabric system of claim 4.

7. A method for protecting an object from heat comprising:
i) providing a composite fabric comprising an outer shell fabric and a liquid barrier;
ii) incorporating a thermal liner in the composite fabric; said thermal liner comprising a sub-assembly and a flame resistant fabric facecloth, the sub-assembly further comprising
   (a) at least one thermally expanding flame resistant fabric consisting of crimped, heat resistant para-aramid fibers held in a state of compression by a thermoplastic binder, the binder being present in an amount of 15 to 45 percent by weight, based on the weight of the binder plus crimped fiber; and
   (b) at least one thermally stable flame resistant stabilizing fabric adhered to an outer surface of the thermally expanding flame resistant fabric by a thermoplastic binder, the surface contact between the thermally stable fabric and the thermally expanding flame resistant fabric being 80 to 100%; and
iii) interposing the composite fabric between an object and a source of heat or flame;
wherein, when the thermal liner sub-assembly is exposed to heat or flame, the thermally stable flame resistant fabric remains flat and dimensionally stable to minimize shrinkage of the thermally expanding flame resistant fabric, the liner increases its thickness in the range from 100% to 1100% and shrinkage of the liner sub-assembly in a machine direction and in a cross direction is no greater than 10%; and the thermal liner sub-assembly has an afterflame of no greater than 2 seconds when exposed to flame in accordance with ASTM D6143-99.

\* \* \* \* \*